US012307074B2

(12) United States Patent
Golan et al.

(10) Patent No.: US 12,307,074 B2
(45) Date of Patent: May 20, 2025

(54) DYNAMIC MODIFICATIONS OF DISPLAYED PAGES TO INTRODUCE NEW WIDGETS

(71) Applicant: TABOOLA.COM LTD., Ramat Gan (IL)

(72) Inventors: Lior Golan, Tel Aviv (IL); Lior Papirblat, Hod HaSharon (IL)

(73) Assignee: TABOOLA.COM LTD., Ramat Gan (IL)

(*) Notice: Subject to any disclaimer, the term of this patent is extended or adjusted under 35 U.S.C. 154(b) by 0 days.

(21) Appl. No.: 18/110,523

(22) Filed: Feb. 16, 2023

(65) Prior Publication Data
US 2023/0195283 A1 Jun. 22, 2023

Related U.S. Application Data

(63) Continuation of application No. 17/237,576, filed on Apr. 22, 2021, now Pat. No. 11,614,852.

(60) Provisional application No. 63/013,856, filed on Apr. 22, 2020.

(51) Int. Cl.
G06F 3/0483 (2013.01)
G06F 3/01 (2006.01)
G06F 3/04812 (2022.01)
G06F 3/0485 (2022.01)

(52) U.S. Cl.
CPC ............ *G06F 3/0483* (2013.01); *G06F 3/013* (2013.01); *G06F 3/04812* (2013.01); *G06F 3/0485* (2013.01)

(58) Field of Classification Search
CPC .... G06F 3/0483; G06F 3/013; G06F 3/04812; G06F 3/0485; G06F 3/0481; G06F 3/048
See application file for complete search history.

(56) References Cited

U.S. PATENT DOCUMENTS

| | | | |
|---|---|---|---|
| 10,505,875 B1 | 12/2019 | Jenks et al. | |
| 10,684,738 B1* | 6/2020 | Sicora | G06F 16/435 |
| 11,460,974 B1* | 10/2022 | Murray | G06F 3/04842 |
| 2007/0162850 A1 | 7/2007 | Adler et al. | |
| 2009/0113346 A1 | 4/2009 | Wickramasuriya et al. | |
| 2010/0058248 A1 | 3/2010 | Park | |
| 2010/0235224 A1 | 9/2010 | Fujioka | |

(Continued)

OTHER PUBLICATIONS

Extended European search report with the European search opinion issued by the European Patent Office for corresponding European Patent Application No. 21169805.5-1203, dated Sep. 22, 2021.

(Continued)

*Primary Examiner* — Matthew Ell
*Assistant Examiner* — Alvaro R Calderon, IV
(74) *Attorney, Agent, or Firm* — Myers Wolin, LLC

(57) ABSTRACT

A method, apparatus, and product for implementing dynamic modifications of displayed pages to introduce new widgets. A new widget is displayed instead of, or in addition to, a pre-existing widget. Both the new widget and the pre-existing widget display content items that are retrieved from a content item repository. Optionally, the pre-existing widget may be a feed and the new widget may be a carousel widget. Content of the new widget may be determined based on interactions, inferred interest, attention, or the like, of the user with the pre-existing feed. The new feed may be first displayed after the pre-existing feed is no longer visible in the page.

21 Claims, 11 Drawing Sheets

(56) References Cited

U.S. PATENT DOCUMENTS

| | | | |
|---|---|---|---|
| 2010/0281393 A1 | 11/2010 | Fujioka | |
| 2010/0299183 A1 | 11/2010 | Fujioka | |
| 2010/0305999 A1 | 12/2010 | Fujioka | |
| 2011/0066477 A1 | 3/2011 | Fujioka | |
| 2011/0093897 A1* | 4/2011 | Gerba | H04N 21/4722 725/42 |
| 2012/0191577 A1 | 7/2012 | Gonsalves et al. | |
| 2013/0067395 A1* | 3/2013 | Nishina | G06F 3/0488 715/784 |
| 2013/0111407 A1 | 5/2013 | Mullen | |
| 2013/0212524 A1* | 8/2013 | Nurse | G06F 40/166 715/788 |
| 2014/0136946 A1* | 5/2014 | Matas | G06F 3/04845 715/810 |
| 2014/0181634 A1 | 6/2014 | Compain et al. | |
| 2014/0181730 A1* | 6/2014 | Briand | G06F 3/04883 715/784 |
| 2015/0127565 A1 | 5/2015 | Chevalier et al. | |
| 2015/0220264 A1* | 8/2015 | Lewis | H04N 21/4825 715/716 |
| 2015/0242091 A1* | 8/2015 | Lu | G06Q 30/0241 715/708 |
| 2015/0286383 A1 | 10/2015 | D'Aloisio et al. | |
| 2015/0339002 A1* | 11/2015 | Arnold | G06F 3/0481 715/854 |
| 2015/0339006 A1* | 11/2015 | Chaland | G06F 3/048 715/835 |
| 2015/0339033 A1* | 11/2015 | Arnold | G06Q 50/01 715/854 |
| 2016/0133062 A1 | 5/2016 | Greenberg et al. | |
| 2016/0196244 A1 | 7/2016 | Greenberg et al. | |
| 2016/0225063 A1 | 8/2016 | Wical | |
| 2016/0274780 A1* | 9/2016 | Anai | G06Q 30/0251 |
| 2016/0321222 A1 | 11/2016 | Greenberg et al. | |
| 2016/0342935 A1 | 11/2016 | Greenberg et al. | |
| 2016/0350730 A1 | 12/2016 | Greenberg et al. | |
| 2016/0357373 A1 | 12/2016 | Greenberg et al. | |
| 2017/0017634 A1 | 1/2017 | Levine et al. | |
| 2017/0115842 A1* | 4/2017 | Yin | G06F 3/04855 |
| 2017/0220215 A1* | 8/2017 | Wu | G06F 3/04845 |
| 2017/0220226 A1* | 8/2017 | Wu | G06F 3/0485 |
| 2017/0262533 A1* | 9/2017 | Chang | G06Q 10/1053 |
| 2017/0351419 A1* | 12/2017 | Urban | G06F 40/117 |
| 2018/0129392 A1* | 5/2018 | Ko | G06F 3/0485 |
| 2018/0174229 A1 | 6/2018 | Sherwin et al. | |
| 2019/0138166 A1* | 5/2019 | Lemp | G06F 16/9558 |
| 2019/0235720 A1* | 8/2019 | Zhang | G06F 3/0485 |
| 2020/0005355 A1 | 1/2020 | Pei et al. | |
| 2021/0065202 A1 | 3/2021 | Bansal et al. | |
| 2021/0224044 A1 | 7/2021 | Soini et al. | |
| 2021/0278932 A1* | 9/2021 | Sos-Munoz | G06N 20/00 |

OTHER PUBLICATIONS

Non-Final Office Action issued by the United States Patent and Trademark Office for U.S. Appl. No. 17/237,576, electronically delivered on Feb. 18, 2022.

Final Office Action issued by the United States Patent and Trademark Office for U.S. Appl. No. 17/237,576, electronically delivered on Aug. 22, 2022.

IAB. "The Native Advertising Playbook." Dec. 4, 2013. https://web.archive.org/web/20180928125844/http://www.iab.com/wp-content/uploads/2015/06/IAB-Native-Advertising-Playbook2.pdf (Year: 2013).

Taboola, "Widgets." Oct. 13, 2018. https://web.archive.org/web/20181013133006/https://pubhelp.taboola.com/hc/en-us/articles/360003205033-Widgets.

Taboola, "How to choose the best format for your marketing content." Apr. 1, 2019. https://web.archive.org/web/20190401024846/https://www.taboola.com/resources/e-book.

Taboola, "The Complete Content Discovery Guide." Mar. 20, 2015. https://web.archive.org/web/20150320041054/http://www.taboola.com/sites/default/files/Content-Discovery-Guide-2014.pdf.

Taboola, "What every Publisher Needs to Know About Native Advertising." Apr. 1, 2019. https://web.archive.org/web/20190401024846/https://www.taboola.com/resources/e-book.

IAB, "IAB New Standard Ad Unit Portfolio." Jul. 2017. https://web.archive.org/web/20190613192046/https://www.iab.com/wp-content/uploads/2017/08/IABNewAdPortfolio_FINAL_2017.pdf.

IAB. "IAB Deep Dive on In-Feed Ad Units." Jul. 2015. https://web.archive.org/web/20150905180135/http://www.iab.net/media/file/IAB_Deep_Dive_on_InFeed_Ad_Units.pdf.

King, M., "Here's How Online Publishers Increase Their RPMs With Taboola." Jan. 19, 2018. https://web.archive.org/web/20180214205020/https://blog.taboola.com/publishers-increase-rpm/.

Walgrove, A., "How to Add Native Advertising to Your Agency Services." Apr. 15, 2019. https://web.archive.org/web/20191003200305/https://blog.taboola.com/native-advertising-agency-services/.

IAB. "Digital Video In-Stream Ad Format Guidelines." Jan. 8, 2016. https://iabtechlabcom/wp-content/uploads/2016/03/DVAFG_2015-01-08.pdf.

IAB. "OpenRTB Dynamic Native Ads API Specification Version 1.2" Jul. 2017. https://web.archive.org/web/20190406033621/https://iabtechlab.com/standards/openrtb-native/.

IAB. "Seeking Better Mobile Ad Experiences: The Scroller Ad Concept." Jun. 30, 2016. https://web.archive.org/web/20181116023528/https://www.iab.com/news/seeking-better-mobile-ad-experiences-scroller-ad-concept/.

Cohen et al., "Intersection Observer API." Apr. 21, 2019. https://web.archive.org/web/20190421232635/https://developer.mozilla.org/en-US/docs/Web/API/Intersection_Observer_API.

MDN web docs. "Timing element visibility with the Intersection Observer API." Apr. 1, 2019. https://web.archive.org/web/20190401113742/https://developer.mozilla.org/en-US/docs/Web/API/Intersection_Observer_API/Timing_element_visibility.

IAB. "Native Ads." 2019. https://web.archive.org/web/20190710085916/https://www.iab.com/newadportfolio/.

Singolda, A., "The Open Web has a Lot to Learn From Social: Introducing Taboola Feed." May 24, 2017. https://web.archive.org/web/20170530154908/https://blog.taboola.com/taboola-feed/ (Year: 2017).

* cited by examiner

TECH
Demo – Next UP

*JUNE 15. 2025 by Yuyu Chen*

Apple unveiled a new iPhone feature this week that aims to cut down on the number of distracted drivers.

The "Do Not Disturb While Driving" setting will automatically silence incoming texts and notifications while an iPhone is connected to a car via Bluetooth or cable, the tech giant announced Monday.

DNDWD, which will be available in fall 2025 with the release of Apple's mobile operating system iOS 11, will allow users to send automatic replies to contacts attempting to reach them while they are behind the wheel.

The auto-reply messages will consist of two responses, according to New York

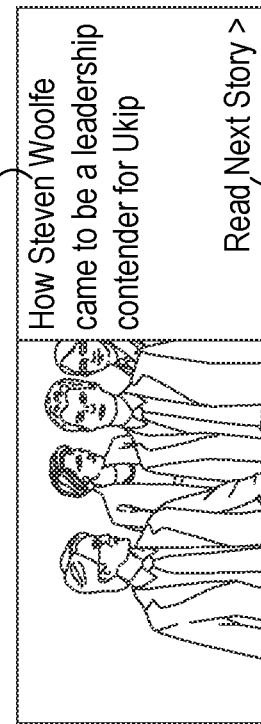

How Steven Woolfe came to be a leadership contender for Ukip

Read Next Story >

FIG. 4

DYNAMIC MODIFICATIONS OF DISPLAYED PAGES TO INTRODUCE NEW WIDGETS

CROSS-REFERENCE TO RELATED APPLICATION

This application is a continuation of and claims the benefit of U.S. patent application Ser. No. 17/237,576, entitled "Dynamic Widget Display Adjustment", filed Apr. 22, 2021, which claims the benefit of provisional patent application No. 63/013,856, titled "Graphical User Interface For Content Consumption" filed Apr. 22, 2020, all of which are hereby incorporated by reference in their entirety without giving rise to disavowment.

TECHNICAL FIELD

The present disclosure relates to display adjustments in general, and to adjusting a display of a browsed page, in particular.

BACKGROUND

Digital content is usually sent from a content source or server, to be consumed in a client or another machine or location. A browser (e.g. web browser) is a software application that consists of numerous software components, which process digital content of various types (normally including information resources identified by uniform resource identifier or locator), together with a set of internal (i.e. defined locally by the browser) and external (i.e. defined by entities other than the browser such as the content source, the operating system, the host device, etc.) directives and constraints, and eventually decides how the content should be laid out and displayed on a display device of a certain host computer, under those specific circumstances.

BRIEF SUMMARY

One exemplary embodiment of the disclosed subject matter is a method comprising: determining whether to present a widget over a display of a user, wherein the display comprises at least a portion of a page that is visible to the user, wherein the page comprises a second widget, wherein said determining is based on an estimated likelihood that the user will reach the second widget in the page, wherein the widget is configured to present in the display one or more content cards associated with the second widget; upon determining that the estimated likelihood is below a first threshold, presenting the widget over the display of the user; dynamically adjusting the estimated likelihood of the user based on interactions of the user with the page, thereby providing an adjusted estimated likelihood; and upon determining that the adjusted estimated likelihood of the user is above a second threshold, removing the widget from the display.

Another exemplary embodiment of the disclosed subject matter is an apparatus comprising a processor and coupled memory, said processor being adapted to perform: determining whether to present a widget over a display of a user, wherein the display comprises at least a portion of a page that is visible to the user, wherein the page comprises a second widget, wherein said determining is based on an estimated likelihood that the user will reach the second widget in the page, wherein the widget is configured to present in the display one or more content cards associated with the second widget; upon determining that the estimated likelihood is below a first threshold, presenting the widget over the display of the user; dynamically adjusting the estimated likelihood of the user based on interactions of the user with the page, thereby providing an adjusted estimated likelihood; and upon determining that the adjusted estimated likelihood of the user is above a second threshold, removing the widget from the display.

Yet another exemplary embodiment of the disclosed subject matter is a computer program product comprising a non-transitory computer readable medium retaining program instructions, which program instructions when read by a processor, cause the processor to perform a method comprising: determining whether to present a widget over a display of a user, wherein the display comprises at least a portion of a page that is visible to the user, wherein the page comprises a second widget, wherein said determining is based on an estimated likelihood that the user will reach the second widget in the page, wherein the widget is configured to present in the display one or more content cards associated with the second widget; upon determining that the estimated likelihood is below a first threshold, presenting the widget over the display of the user; dynamically adjusting the estimated likelihood of the user based on interactions of the user with the page, thereby providing an adjusted estimated likelihood; and upon determining that the adjusted estimated likelihood of the user is above a second threshold, removing the widget from the display.

Optionally, the widget is a carousel element.

Optionally, the second widget is a feed.

Optionally, the carousel element is configured to present content items that are associated with the feed.

Optionally, the method comprises selecting the one or more content cards of the feed/second widget to be presented in the carousel element/widget based on historic interactions of the user with content, a user profile of the user, an order of content items in the feed/second widget, the interactions of the user with the page, or the like.

Optionally, the estimated likelihood that the user will reach the feed/second widget is determined based on a user profile of the user indicating historic user consumption tendencies, a distance between the feed/second widget and the display, detected patterns of interactions of the user with the page, historic interactions of a plurality of users with the page, or the like.

Optionally, the interactions of the user with the page comprise: a mouse hover, a scrolling speed, an acceleration of a scrolling speed, an eye movement, an orientation of a device rendering the page, a cursor movement, a selection of an item, or the like.

Optionally, presenting the carousel element/widget over the display comprises presenting the carousel element/widget at a top of the display or at a bottom of the display.

Optionally, the method comprises dynamically adjusting the estimated likelihood by monitoring the interactions of the user with the page.

Optionally, removing the carousel element/widget from the display is performed based on identifying that the feed/second widget is visible in the display.

Optionally, the method comprises: upon determining that the user has reached the feed/second widget, identifying one or more content cards that are estimated to be of interest to the user, wherein said identifying is based on direct or indirect user interactions with the one or more content cards in the feed/second widget; and upon determining that subsequently to reaching the feed/second widget, the user has reached an article of the page, whereby causing the feed/second widget to not be visible to the user, displaying a personalized carousel for the user, wherein the personalized carousel comprises content items that correspond to the one or more content cards.

Optionally, the content items comprise at least one of the one or more content cards of the feed/second widget.

Optionally, the content items comprise one or more content items that share one or more attributes with the one or more content cards, wherein an attribute of the one or more attributes is a topic, a publisher, a visual appearance, or the like.

Optionally, the personalized carousel comprises a BottomReminder widget.

Optionally, the carousel element/widget comprises a NextUp widget, and the page is a webpage browsed by a browser of an end device of the user.

THE BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings:

FIG. 4 illustrates an exemplary embodiment of a display, in accordance with some exemplary embodiments of the disclosed subject matter;

DETAILED DESCRIPTION

Figure 1:
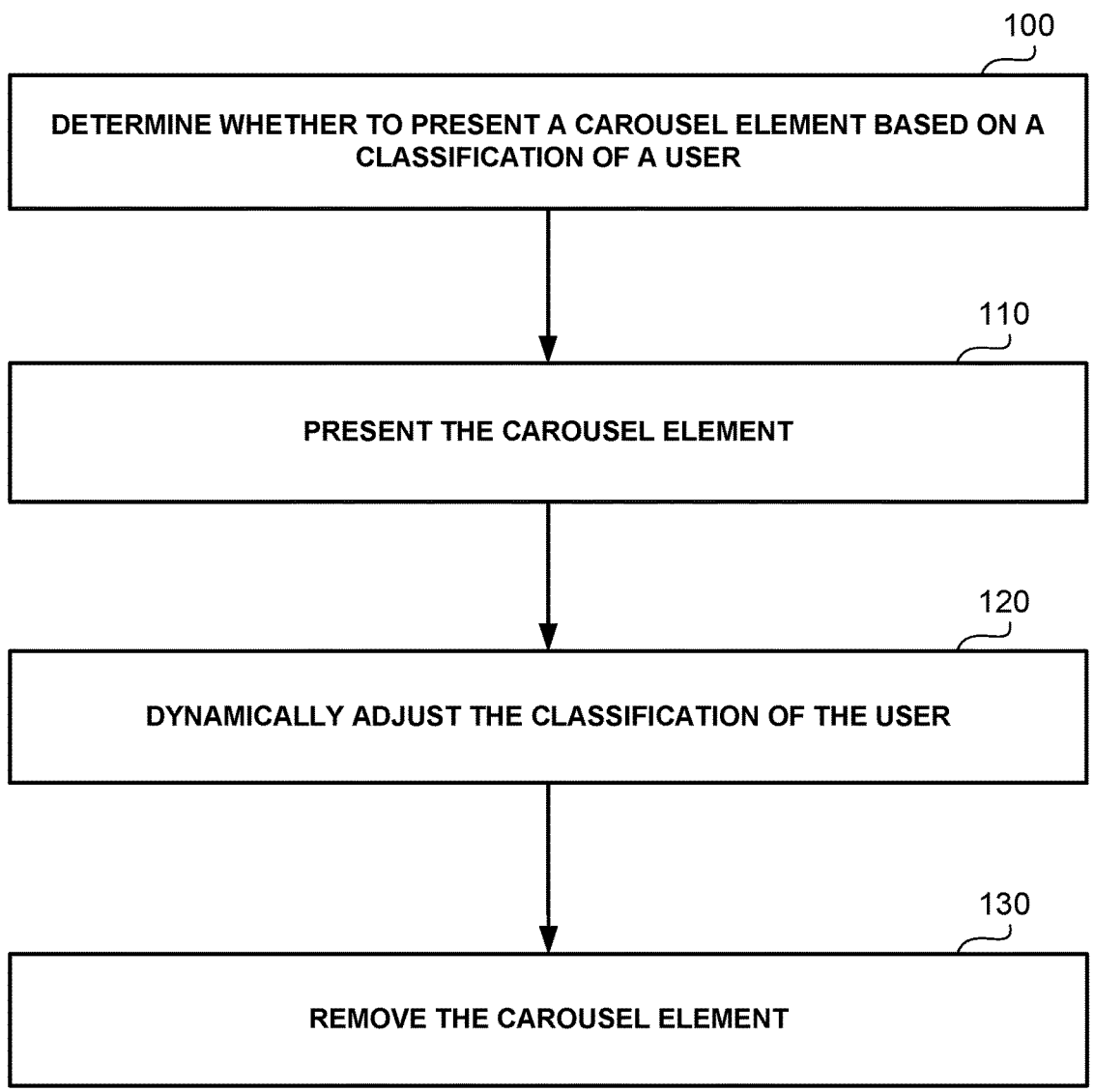
FIG. 1 shows a flowchart diagram of a method, in accordance with some exemplary embodiments of the disclosed subject matter.

One technical problem dealt with by the disclosed subject matter is to adapt or adjust a display of a page, e.g., a webpage. In some exemplary embodiments, a user may consume content of a page via a browser of an end device. In some exemplary embodiments, browsers may comprise a software that runs on an end device, obtains digital content, and renders the content in a user interface such as in a Graphical User Interface (GUI). In some exemplary embodiments, the browser may handle one or more browsing functionalities such as obtaining content and code from multiple entities, e.g., publishers, advertising entities, content servers, or the like. In some exemplary embodiments, the content may be displayed for users in layouts referred to as "pages", thereby browsing pages of content.

In some exemplary embodiments, a user may consume a browsed page via an interface of a computerized device such as a Personal Computer (PC), a laptop, a smart phone, a mobile phone, a tablet, or the like. In some exemplary embodiments, the browsed page may include a main content portion such as an article. In some exemplary embodiments, the GUI of the page may comprise an additional "feed" of content cards (also referred to as "content items"), which may be rendered and displayed in addition to rendering and displaying the main content portion. In some exemplary embodiments, the feed may comprise one or more cards of content items associated with content, recommendations, or the like. In some exemplary embodiments, the content cards may comprise one or more media portions such as advertising content items, content recommendations such as recommendations of similar articles, or the like, which may be presented to the user in the feed. In some exemplary embodiments, the feed may be reachable by scrolling down from the article. Additionally or alternatively, the feed may be located at the top of the article, to the left of the article, to the right of the article, or the like.

In some exemplary embodiments, the feed may comprise a predetermined set of articles. Additionally, or alternatively, the feed may be an endless feed that dynamically loads additional content items as the user scrolls or otherwise interacts with the feed. For example, upon reaching to the end of the feed, the feed may invoke a dynamic load instruction to load additional content items thereto. As another example, the feed may invoke the dynamic load instruction prior to reaching the end of the feed, such as when reaching a predetermined location in the feed. In some exemplary embodiments, the loading may be invoked when the user passes the 75% percentile of the loaded feed (or any other relative location), when the user reaches the item that is fifth before the end (or any other absolute location).

In some exemplary embodiments, the feed may comprise cards linked to content belonging to one or more domains of one or more publishers, such as the original publisher, third party publishers, a combination thereof, or the like. In some exemplary embodiments, the feed may include organic or non-organic (e.g., sponsored) content that may be matched to the user based on information relating to the user, to the article, or the like. For example, the content may be matched based on a user profile, based on behavioral patterns, based on demographic information, based on user interest, based on content of the article, or the like. In some exemplary embodiments, a content card may be linked (e.g., comprise a link to) or associated with a target page that may be loaded upon selection of the card, may include a media content that may be activated upon selection of the card, may comprise client-side code to be invoked in response to selection of the card, or the like. In some cases, a content item may be an element where users can leave comments on the article. In some exemplary embodiments, in case a content card is linked to a target page, the card may comprise one or more text portions such as a title associated with the target page, a summary of content of the target page, one or more images associated with the target page, one or more audio files associated with the target page, one or more links to the target page, or the like. In some exemplary embodiments, a content item may enable a user to engage therewith such as via a link, a play control or button enabling to play an audio or video, an input form for a user to fill in, and the like. In some exemplary embodiments, upon selecting or pressing one of the cards or a link thereof an audio or video clip may be played, the browser may navigate to the target content page linked to the card, or the like.

In some exemplary embodiments, the cards may be selected from a repository of content items and provided to the feed of a user by an item selector such as a content recommendation engine, an ad server, an advertising platform, a publisher of the main content portion, the browser, a software agent on the end device browsing the page, or the like. In some exemplary embodiments, the cards may be selected for the feed of a user based on user information, a context of a session, behavior information of the user, historical tracking information and engagement data relating to the user or similar users, historical tracking information and engagement data relating to the article or similar articles, other real-time factors, global events, a combination thereof, or the like. As an example, one content item may be linked to an article that has a same topic as the currently browsed article in the page, has a similar content as the currently browsed article, originates from a same publisher as the currently browsed article, or the like. As another example, a content item may comprise a sponsored link that is of potential interest to the user, which may be determined in view of information relating to the user such as topics or categories of articles that were consumed by the user, historic searched by the user, historic transactions of the user, or the like. It may be desired to enhance a User eXperience (UX) of a user consuming content of the page, e.g., the article and/or the feed.

Another technical problem dealt with by the disclosed subject matter is enhance a visibility of the feed for users of end devices that have a limited screen size. In some exemplary embodiments, users may browse content via small screens, which may limit the visibility of the feed, limit space for excess content that does not harm the UX, or the like. It may be desired to enable to user to consume feed cards via any sized screen, and to ensure that the user is enabled to perceive cards of the feed via any sized screen of a utilized end device.

Yet another technical problem dealt with by the disclosed subject matter is to prevent the user from browsing an article without being exposed to any content of the feed. In some cases, users may consume an article without scrolling down to the feed, which may reduce the effectiveness or revenue of the feed providers, reduce a UX of the user, or the like. In some exemplary embodiments, it may be desired to enhance an effectiveness of the feed and ensure it can be perceived by the user without requiring her to locate the feed herself.

Yet another technical problem dealt with by the disclosed subject matter is to personalize a presentation of feed cards according to a user's actions, a user's profile, or the like. In some exemplary embodiments, different types of users may conduct different types of interactions with the display of their end device. In some exemplary embodiments, at each moment, a certain portion of a loaded page may be displayed to the user, in a manner that the user is enabled to perceive only that portion of the page. This portion may be referred to herein as the "display" portion of the page. In some exemplary embodiments, the visible portion of the overall content that the user can see, can also be referred to as "viewport", "seen area", "visible portion", or the like. In some exemplary embodiments, the display portion may alter upon scrolling up or down a page, zooming in or out, or the like, as different content portions of the same page are made visible. In some exemplary embodiments, the display may alter upon altering the page, e.g., by navigating to a different page. It may be desired to personalize the display of the page and present therein one or more cards of the feed that are predicted to be of interest to the user, that are estimated to cause the user to engage therewith in a high probability, or the like.

Yet another technical problem dealt with by the disclosed subject matter is to adapt a presentation of feed cards so that their visibility is enhanced, in a balanced manner without harming the UX of users with small screens of end devices. In some cases, mobile interfaces of mobile devices may comprise small screens, e.g., smaller than screens of personal computers, that may be disrupted by presenting excess content items.

One technical solution is to determine whether or not one or more carousel GUI elements are to be added to a display portion of a browsed page. In some exemplary embodiments, a user browsing the page may be dynamically classified as a partial consumer that is estimated not to reach a feed of the page, or as a full consumer that is estimated to reach the feed of the page. In some exemplary embodiments, a carousel element configured for presenting content of feed cards may be determined to be added or not to be added to the display based on the classification of the user. In some cases, there may be different types of full consumers, such as thorough readers that first read the article and reach the feed thereafter, and cursory readers that briefly read the article, potentially only reading highlighted or other portions thereof, reach the feed and potentially return to read the article again thereafter. In some exemplary embodiments, the classification of the user may be determined or calculated dynamically, continuously, iteratively, periodically, upon defined events, or the like, and the presentation of the carousel element may be adjusted according to any update in the classification of the user.

In some exemplary embodiments, upon determining that the user is classified as partial consumer that is not estimated to reach the feed, a feed carousel GUI element (also referred to as a "feed carousel", "feed carousel widget" or "NextUp widget") may be added to the display and utilized for displaying items such as card items from the feed. In some exemplary embodiments, users that are classified as partial consumers may be provided with the feed carousel, which may be generated as an overlay above their display. In some exemplary embodiments, users that are classified as full consumers may or may not be provided with the feed carousel, e.g., in case a confidence score of the classification complies with a threshold, or in any other case. For example, users that are classified as full consumers with a confidence score of the classification that is below a threshold, may also be provided with the feed carousel, e.g., with a reduced saliency level, with a reduced portion of the display, or the like.

In some exemplary embodiments, the feed carousel may be determined to be presented or removed from a display dynamically, e.g., based on a change in the classification of the user (e.g., re-classifying the user as a partial consumer instead of a previous classification of a full consumer, or vice versa), based on a change in the confidence score of a classification, or the like. In some exemplary embodiments, the prediction of the user's consumption behavior may be dynamically updated such as based is on a change of the user behavior, newly detected user interactions with the page, identified actions of the user, identified events of the GUI, or the like. In some exemplary embodiments, upon reaching the feed, the user may be automatically classified as a full consumer with a confidence score of 100% (as the entire article was de-facto consumed). In some exemplary embodiments, as the user scrolls towards the end of the article, the confidence score of the user being a full consumer may be recalculated and increased.

Additionally or alternatively, instead of classification of the user, an estimation of the probability that the user would reach the feed may be computed, and such estimated probability may be utilized. For example, if the probability is below a threshold, the functionality of a partial consumer may be implemented, whereas if the probability is above the threshold, the functionality of a full consumer may be implemented.

In some exemplary embodiments, the classification of the user may be performed based on a real-time profiling of the user e.g., identifying her mood, her intent, or the like, based on information from the session of loading the page, e.g., referrer information, based on past information on the user, e.g., a user profile and interaction history, based on historical data from similar users or similar contexts, or the like. For example, the classification may determine that there is a probability of 80% that the user will not reach the end of the article, and accordingly, the user may be classified as a partial consumer and a carousel widget may be added to the display. According to this example, the carousel widget may be displayed when the probability is above a threshold, e.g., 45%, indicating that the user is a partial consumer, and may not be displayed in case the probability is below the threshold, e.g., indicating that the user is a full consumer and is estimated to reach the feed.

As the user browses the page, and based on user interactions or lack thereof, such as mouse movement, scrolling pattern, mobile device angle, eye tracking information, or the like, it may be determined that the probability of the user to reach the end of the article has increased, decreased, or the like, and accordingly, the classification of the user may be adjusted. In some exemplary embodiments, in response to a classification adjustment, the carousel widget may continue to be displayed, potentially in a different presentation manner such as in a different side of the display (e.g., as may be determined by display and presentation logic). In some cases, as the user continues to scroll down the article, the probability that the user will reach the feed at the end of the article may be determined to increase, and the probability that the user will not reach the feed may be determined to decrease. In some exemplary embodiments, when the user reaches the end of the article, and the feed is exposed in the display, the probability that the user will reach the feed may be of an absolute certainty (100%), and the probability that the user will not reach the feed may be 0%. Accordingly, when the user reaches the feed (or before she reaches it), the carousel element may be removed from display or otherwise hidden.

In some exemplary embodiments, the feed carousel may be implemented with a changing content, or other display presentation or layout of displaying multiple content items of the feed over time in a restricted space. In some exemplary embodiments, a single content item may be displayed in the feed carousel at a given time. In some exemplary embodiments, in case that the user clicks on a content item presented by the feed carousel, an action associated with the chosen content item may be activated, e.g., an audio or video clip may be played, a link that is associated with a target content item or page may be followed and a linked page may be browsed, or the like. In some exemplary embodiments, the feed carousel may allow multiple pieces of content to occupy a single coveted space, e.g. sequentially. In some exemplary embodiments, the feed carousel may include a rotation of a number of content cards such as in an animation from left to right, or in any other manner of presentation. In some exemplary embodiments, when using the carousel element, content may rotate or otherwise change between a set of alternative content items, such as periodically (e.g., every second, every two seconds, every minute, or the like), resulting in a potentially circularly changing display. In some exemplary embodiments, the feed carousel may include one or more static carousels, rotating carousels, feature area carousels, a filmstrip of several clickable feed cards, or the like. In some exemplary embodiments, the feed carousel may be displayed via an overlay above the page, via an overlay over the display (possibly on top of other content of the page), via a presentation UI at the top of the display, via a "sticky" UI, via a static UI, e.g., placing the feed carousel in the same location in the page regardless of the changing display, or the like. In some exemplary embodiments, the feed carousel may be displayed at a bottom, right side, left side, corner, or in any other locations in the display that is visible to the user.

In some exemplary embodiments, attributes of the feed carousel may be determined initially based on consumption attributes of the user, based on attributes of the user device such as its screen size or angle, based on attributes of the article, or the like. In some exemplary embodiments, attributes of the feed carousel may include the content selected to be displayed by the feed carousel, the manner in which the feed carousel is presented such as its position in the display, or the like. In some exemplary embodiments, attributes of the feed carousel may be modified iteratively, dynamically, or the like, e.g., based on changes in the classification of the user, based on changes of a probability that the user will reach the feed such as an increase or decrease in the probability, based on interactions of the user, as a function of the time, or the like. For example, a saliency level of the feed carousel may increase in case the probability that the user is a partial consumer increases, respectively, and vice versa. In some exemplary embodiments, the feed carousel may be utilized to increase the exposure of the feed for users that are not expected to reach the feed, without harming a UX of users that are expected to reach the feed.

In some exemplary embodiments, the classification of the user may be determined locally at a computerized device displaying the article, at a remote server, or the like. In some exemplary embodiments, the page may be rendered at a computerized device such as a client device, an end device, a user device, or the like, which may be configured, directly or indirectly, to determine the classification of the user. In some exemplary embodiments, the classification may be determined elsewhere, e.g., at a server, a computing cloud, or the like. Additionally or alternatively, a software agent may obtain the classification from a remote computerized device such as a server, or the like. Additionally, or alternatively, a software agent may determine the classification locally, without requiring real-time connectivity.

In some exemplary embodiments, users that have reached the feed and returned to the article may be provided with a personalized carousel (also referred to as "BottomReminder"), which may be generated over their display. In some exemplary embodiments, the personalized carousel may be presented instead of the feed carousel, instead of the feed itself, instead of a portion of the feed, or the like. In some exemplary embodiments, in case the user has scrolled down to the feed and shown interest in one or more portions or cards thereof, the user intent may be analyzed, and a personalized carousel may be generated to include the cards of the feed that were estimated to draw the user's attention, cards that are similar thereto, or the like. In some exemplary embodiments, a substantial number of webpage consumers, such as 20%, 30%, 40%, or the like, may tend to scroll down to the end of the article, interact with the feed, and then scroll back up in order to continue consuming the article. In such cases, as the user may be likely to be interested in the feed, a personalized carousel widget may be displayed. In some exemplary embodiments, the personalized carousel may serve as a reminder of content items of the feed that were estimated to draw the user's attention when consuming the feed.

In some exemplary embodiments, the personalized carousel may comprise a carousel widget that enables to display several items sequentially, e.g., similarly to the feed carousel. In some exemplary embodiments, the personalized carousel may include a carousel widget that comprises one or more content items that appear in the feed, such as a reading recommendation, a comments pane, or the like. In some exemplary embodiments, the personalized carousel may be positioned in the bottom area of the display, thereby resembling the feed. Alternatively, the personalized carousel may be positioned in any other side or area of the user's display.

In some exemplary embodiments, the personalized carousel may include a carousel widget that comprises one or more content items with which the user interacted, e.g., feed cards that appear in the feed and were perceived by the user, feed cards that had drawn the user's interest or attention, or the like. In some exemplary embodiments, one or more content items appearing in the feed may be selected to appear also in the personalized carousel widget. As an example, content items that are similar or identical to items which the user has shown interest in may be determined to be displayed in the personalized carousel widget. The similar items may or may not appear in the feed, and may be determined to be similar in case they have one or more overlapping attributes such as topics, publishers, or the like. As another example, the content items determined to appear in the personalized carousel widget may be dissimilar to content items to which the user expressed explicit or implicit interest in within the feed. In some cases, such selection may be useful in increasing content diversity for certain users whose current mood and intent indicate that they prefer diversity. In some exemplary embodiments, the personalized carousel may comprise content items that are selected from the feed based on the user's interaction with the feed, e.g., where the user lingered, the cursor locations within the feed area, or the like. In some exemplary embodiments, elements presented in the personalized carousel may comprise elements that are predicted to be of interest to the user based on the user's interaction with the feed.

It is noted that an interaction, in the present disclosure, refers to actions performed or not performed by the user with respect to a target element, including implicit, explicit, direct or indirect actions, as well as behavioral activities, such as eye movements obtained from eye tracking. For example, the speed and acceleration of the scrolling activity may be indicative of whether the user is reading a specific content item. As another example, eye tracking may be used to track whether the user is reading any of the content cards and which content cards are of most interest to her. As yet another example, mouse activity may indicate interest in content cards. For example, some users may tend to read using the mouse cursor as a guiding point to their eyes, and therefore the location of the cursor may be indicative of interest of the user in specific portions of the feed, e.g., a specific content card.

In some exemplary embodiments, the personalized carousel may be displayed via an overlay generated and rendered at a bottom of the display of the user or in any other position of area of the display, e.g., in a manner that resembles the feed's layout. In some exemplary embodiments, the personalized carousel may constitute a constant reminder of the content of the feed that is no longer visible, thereby providing a consistent user experience to the user. In some exemplary embodiments, the personalized carousel may provide the user a quick and easy manner to reach content cards of interest, thereby enabling the user to consume content of interest without scrolling all the way down to the feed.

In some exemplary embodiments, the display of the user may be adapted dynamically and continuously, e.g., by determining whether or not a GUI element such as a carousel widget, should be displayed in the display, whether the display parameters of the carousel widget (e.g., size, color) should be altered, a configuration of the display parameters, whether a sub-element of the carousel widget should be displayed and how, or the like. In some exemplary embodiments, the UX of the display may be modified based on the user's detected behavior or behavior prediction, reminding her of the feed and the feed card that has drawn her interest. In some exemplary embodiments, a carousel widget may be dynamically determined to be or not to be relevant for the experience of the user. In some exemplary embodiments, a carousel widget in the user's display may be dynamically removed from the display, hidden from the display, presented with different presentation parameters in the display, displayed in a modified manner, added to the display, placed over the display, or the like. In some exemplary embodiments, the UX may be modified as a function of the detected or predicted behavior of the user, such as based on a classification of the user as a full or partial consumer, as a function of additional factors such as a context of the user's session, or the like. In some exemplary embodiments, the context of the user's session may comprise geolocation parameters, a time of day, a day of the week, occurrence of global events, or the like.

One technical effect of utilizing the disclosed subject matter is to provide an improved UX of a display, based on user characteristics and identified user activities.

Another technical effect of utilizing the disclosed subject matter is to present to the user feed cards in case she is not expected to reach the feed. Utilizing the disclosed subject matter may enable to dynamically determine a probability that the user will reach the feed, and avoid from overwhelming the user with excess feed cards in case the user is estimated to reach the feed. In some exemplary embodiments, adjusting the display to include the feed cards may provide the user a quick and easy manner to reach content cards of interest, thereby enabling the user to consume content of interest without being required to navigate to the feed.

Yet another technical effect of utilizing the disclosed subject matter is to present to the user a carousel element that enables a user to be reminded with feed cards that drew her attention in a previous interaction with the feed. In some exemplary embodiments, the carousel element may constitute a constant reminder of the content of the feed that is not being shown, thereby providing a consistent user experience to the user.

Yet another technical effect of utilizing the disclosed subject matter is to optimize usage of the limited area of the display. In some exemplary embodiments, the user may be using a mobile device with a screen that may be relatively small compared to a screen of a personal computer. Any unnecessary GUI elements such as carousel elements presenting a feed card may adversely affect the user experience, on one hand, and on the other hand, such elements may be important to increase provided information to the user, increase a monetization from user traffic, or the like. The disclosed subject matter balances between these two affects, thereby enhancing the overall UX of the user and the performance of the feed. The disclosed subject matter may provide for one or more technical improvements over any pre-existing technique and any technique that has previously become routine or conventional in the art. Additional technical problem, solution and effects may be apparent to a person of ordinary skill in the art in view of the present disclosure.

Referring now to FIG. 1, illustrating a flowchart diagram of a method, in accordance with some exemplary embodiments of the disclosed subject matter.

On Step 100, a determination as to whether or not a carousel element is to be presented over a display of a user may be made. In some exemplary embodiments, the display may comprise at least a portion of a page that is visible to the user, the page including a webpage browsed by a browser of an end device. In some exemplary embodiments, the carousel element may comprise a NextUp widget, a carousel GUI element, or the like, which may be configured to present one or more content cards associated with the feed in the display. In some exemplary embodiments, a behavior of a user such as a future interaction with the page's feed may be predicted, and the display may be adapted based thereon.

In some exemplary embodiments, an estimated likelihood that the user will reach the feed in the page may be determined. In some exemplary embodiments, based on the estimated likelihood, users may be dynamically classified as partial consumers, which includes a category of users that are not expected to reach the feed at the end of the article for various reasons, or as full consumers, which are expected to reach the feed. In some exemplary embodiments, the classification of the user may be determined based on user behavior, historic behavior of the user, a user profile of the user indicating historic user consumption tendencies, detected interactions of the user with the page, a distance or gap between the feed and the display, detected patterns of interactions of the user with the page, historic interactions of a plurality of users with the page, historic user behavioral patterns, or the like. For example, a probability that the user will reach the feed may increase as the user scrolls further down the page, as the distance between the display and the feed decreases, or the like. In some exemplary embodiments, the classification of the users may be determined based on a profile of the user such as indicating that in the past the user has not consumed feed content in similar articles, based on patterns of behavior of the user that affect the probability of consuming the feed, or the like. For example, patterns of behavior of the user may indicate that in case the user scrolls down in a certain speed he will not consume the feed. In some exemplary embodiments, the classification may indicate whether or not the user is expected to scroll down to the end of the article, e.g., thereby approaching the feed below the article.

In some exemplary embodiments, in case a probability that the user will reach a feed of a browsed page is estimated to be below a threshold, the user may be classified as a partial consumer, to which a carousel widget may be presented to encourage her to consume feed content. In some exemplary embodiments, in case a probability that the user will reach a feed of a browsed page is estimated to be greater or equal to a threshold, the user may be classified as a full consumer, to which a carousel widget may not be presented. In some exemplary embodiments, since full consumers are estimated to consume the feed, it may not be necessary to present to such users feed cards that may negatively affect the layout of the display, the UX of the display, the screen area, or the like.

In some exemplary embodiments, the feed carousel may be determined to be removed or hidden from the display in case the classification indicates that the user is a full consumer that is predicted to reach the feed, to approach the feed, to interact with the feed, or the like, e.g., in which case the feed carousel may become redundant or even a disturbance to the UX. In some exemplary embodiments, the feed carousel may be determined to be added or presented in the display in case the classification indicates that the user is a partial consumer that is predicted not to reach the feed. In case that a probability that the user will reach the feed is estimated to be below a threshold, the user may be classified as a partial consumer, and a carousel widget may be displayed, e.g., until the probability is adjusted and indicates that the user is a full user.

In some exemplary embodiments, any of the above determinations may be performed using a predictor or classifier, e.g., at a local agent, at a remote server, or the like. In some exemplary embodiments, the probability or estimated likeliness that the user will reach the feed may be determined locally, remotely, or the like. In some exemplary embodiments, a software agent may be executed on the computerized device, such as based on an a-priori installation thereof, execution of dynamically obtained code, or the like. Additionally or alternatively, the agent may be implemented by a script that is being executed by a web browser used by the user to view the web page. Additionally, or alternatively, the agent may be implemented as part of a Software Development Kit (SDK) that may be compiled together with the executable of the mobile application. In some exemplary embodiments, the agent may be configured to obtain metadata regarding the user, such as metadata representing static information about the user (e.g., historical data, profile data, demographic data, or the like), to obtain user-related interaction with the current GUI (e.g., scrolling activities and patterns, the mobile device being at a reading angle, a cursor movement, or the like), to obtain a context indicating metadata regarding the current consumption of the article (such as current location of the user, the time of day, the data, global events, or the like), to determine and to provide probabilities, or the like.

In some exemplary embodiments, the agent may comprise or utilize a classifier such as a machine learning classifier, a data-driven classifier, a heuristics based classifier, or the like. The classifier (also referred to as a predictor) may be trained based on previous interactions of users with possibly different GUIs of displays, different pages of same or different categories, different content items, different real-time factors and session contexts, or the like. In some exemplary embodiments, the classifier may employ classification algorithms to identify a type of a user, e.g., a full consumer type or a partial consumer type. In some exemplary embodiments, the classifier may be implemented using supervised learning, may be trained using labeled data regarding users, or the like. The classifier may utilize an Artificial Neural Network (ANN), a Support Vector Machine (SVM), a decision tree, or the like. In some exemplary embodiments, the classifier may be trained based on the user's behavior, based on behavior of users as a whole, based on behavior of users that are similar to the user, or the like. The classifier may be executed on a remote server, locally on the device, or the like.

In some exemplary embodiments, clustering algorithms may be employed to determine clusters of user behavior over a set of user records. Each cluster may comprise a type of a user, e.g., a full consumer category of users that tend to scroll down and consume the feed, and a partial consumer category of users that tend to consume the article without scrolling to the feed at the end of the article. In case a user starts to read an article, a record comprising data regarding the user may be provided to the classifier. The classifier may determine a cluster that the record of the user may be associated therewith or otherwise identify the type of user matching the current user. In case that the classifier classifies the user as a full consumer, carousel widgets may be hidden or removed from the display. For example, users that tend to lose their patience quickly after starting to consume an article may be identified based on their interaction patterns and classified as a partial consumer, as they may have a low chance of reaching the feed, and carousel widgets may be rendered visible to such users.

On Step 110, upon determining that the classification of the user classifies the user as the partial consumer, a carousel element, e.g., the feed carousel, may be presented over the display of the user. In some exemplary embodiments, the user may be classifies as a partial consumer in case the estimated likelihood that the user will reach the feed in the page is below a first threshold. In some exemplary embodiments, upon determining that the classification of the user classifies the user as a full consumer, the carousel element may not be presented over the display of the user, may not be generated at all, or the like. In some exemplary embodiments, the carousel element may be presented over the display, e.g., at a top of the display, at a bottom of the display, a portion of a top area of the display, a portion of the bottom area of the display, or the like.

In some exemplary embodiments, the carousel widget may be presented as an overlay over the visible display, over a browsed page, or the like. In some exemplary embodiments, the carousel widget may present content of one or more feed cards of a feed of the page, e.g., thereby encouraging the user to consume content cards of the feed. In some exemplary embodiments, content cards of the feed may be selected to be presented in the carousel element in case they are determined to be of interest to the user, e.g., based on historic interactions of the user with content, an order of content items in the feed, a user profile of the user, interactions of the user with the page, or the like. In some exemplary embodiments, the presentation of the carousel widget may be determined based on a screen size of the user, based on a probability of the user's classification, based on display parameters that are estimated to be affective, or the like. For example, in case a user is determined to consume target content of feed cards that are presented in a certain display configuration, the display configuration may be utilized for future feed card presentations to the user.

In some exemplary embodiments, the content items appearing in the feed carousel may be selected or obtained from a same source or entity as the content items appearing in the feed, e.g., from a same server, a same advertising platform, a same publisher, or the like. In some exemplary embodiments, the content items appearing in the feed carousel may be selected from the feed cards, based on the feed cards, or the like. In some exemplary embodiments, the content items appearing in the feed carousel may be selected based on an estimation of a future user engagement therewith, based on a user profile, based on heuristics, or the like. In some exemplary embodiments, a top N results appearing in the feed may be selected to appear in the feed carousel. As an example, the three first items of the feed may be selected to be presented in the feed carousel. Additionally or alternatively, the determination of items to the feed carousel may be made independently from the selection of items to the feed, independently from the feed, independently from an entity handling or providing the feed, or the like.

On Step 120, the classification of the user may be dynamically adjusted based on interactions of the user with the page, thus providing an adjusted classification. In some exemplary embodiments, dynamically adjusting the classification may comprise monitoring the user interactions with the page, and performing a new calculation of the user's classification based thereon. In some exemplary embodiments, the interactions of the user with the page may comprise a mouse hover, a scrolling speed, an acceleration of a scrolling speed, an eye movement, an orientation of a device rendering the page, a cursor movement, a selection of an item, a combination thereof, or the like. In some exemplary embodiments, the classification of the user may be dynamically adjusted based on changing attributes of a user session such as a changing a displayed area of an article in the page, a changing distance between the article and the feed, monitored user interactions with the display, or the like.

In some exemplary embodiments, attributes of the carousel widget may be updated based on the adjusted classification. In some exemplary embodiments, the attributes may include associated content items such as feed cards, a location of the display in which the carousel widget is positioned, display parameters of the carousel widget, whether or not the carousel widget is presented, a saliency level, or the like. In some cases, in case a classification of a user is altered from a full consumer to a partial consumer of vice versa, the presence of the carousel widget itself may be altered. In some cases, in case a classification of a user is retained with altering probabilities or confidence scores, the presence of the carousel widget may be retained, but display parameters may be adjusted, e.g., a location of the carousel widget, a saliency level of the carousel widget, a content of the carousel widget, or the like. For example, in case a probability that the user will reach the feed increases, but the user is still classified as a partial consumer, the carousel widget may be presented in a smaller portion of the display, occupying less space of the user's screen.

On Step 130, the carousel element may be removed from the display upon determining that the adjusted classification of the user classifies the user as a full consumer. In some exemplary embodiments, the user may be classifies as a full consumer in case the estimated likelihood that the user will reach the feed in the page is above a second threshold, e.g., an identical threshold to the first threshold that was used to classify the user as a partial consumer on Step 110 or a different threshold. In some exemplary embodiments, removing the carousel element from the display may be performed based on identifying that the feed is visible in the display, e.g., providing a probability of reaching the feed with 100%. In some exemplary embodiments, the user may be classified as a full consumer based on any other criteria or conditions, such as identifying that the user typically scrolls down to the feed if she has already scrolled down a certain percentage of the article, identifying that a distance between the article and the feed is reduced below a distance threshold, or the like.

Figure 2:
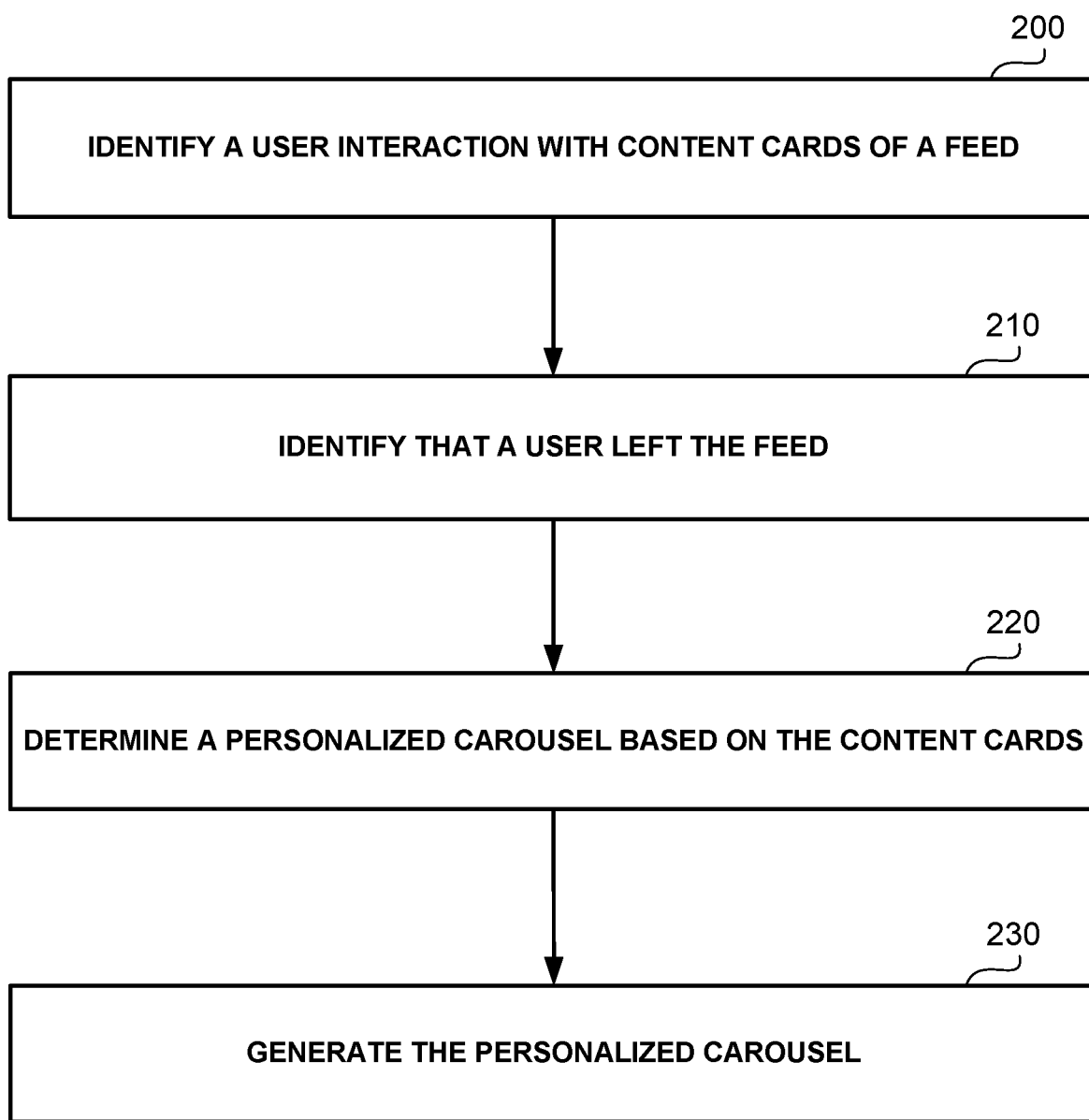
FIG. 2 shows a flowchart diagram of a method, in accordance with some exemplary embodiments of the disclosed subject matter.

Referring now to FIG. 2, illustrating a flowchart diagram of a method, in accordance with some exemplary embodiments of the disclosed subject matter.

On Step 200, a user interaction with content cards of the feed may be identified, e.g., subsequent to Step 130 (FIG. 1), subsequently to the user reaching the feed, or the like. In some exemplary embodiments, the feed may be positioned below the article, or in any other location with respect to the article.

In some exemplary embodiments, upon determining that the user has reached the feed, interactions of the user with the feed may be monitored. In some exemplary embodiments, the interactions may comprise direct interactions such as selecting and consuming one or more content cards, placing a cursor on a content cards, or the like. In some exemplary embodiments, the interactions may comprise indirect interactions such as lingering near a content card, looking at a content card for a defined timeframe, or the like. In some exemplary embodiments, one or more content cards that are estimated to be of interest to the user may be identified, e.g., based on the monitored user interactions with the feed.

On Step 210, the user may leave the feed, e.g., to reach the article, scroll away from the feed to the article, scroll away to a different page element, or the like. In some exemplary embodiments, returning to the article may indicate that the user is interested in both the article and in feed cards. In some exemplary embodiments, the user interactions with the page may be monitored in order to identify changes in the display of the user, performed actions of the user, or the like. In some exemplary embodiments, upon determining that subsequently to reaching the feed, the user has reached an article of the page, whereby causing the feed to not be visible to the user, an additional carousel component may be added to the display, e.g., a personalized carousel acting as a reminder of the deserted feed.

On Step 220, the personalized carousel may be determined or configured based on the content cards with which the user interacted. In some exemplary embodiments, upon determining that the user has scrolled up to the article of the page subsequently to interacting with the feed, a personalized carousel may be determined for the user, e.g., a BottomReminder widget. In some exemplary embodiments, information obtained about a user while engaging with the feed may be utilized, e.g., even in case the user is no longer viewing the feed, such as when the user has returned to view the article itself by scrolling up from the feed and back to view the article content again. In some cases, any other user behavior may be targeted for selecting and presenting feed cards via the personalized carousel. In some exemplary embodiments, the personalized carousel may be generated over the display, thereby reminding the user of the one or more content cards in the feed. In some exemplary embodiments, the personalized carousel may comprise content items that correspond to the one or more content cards with which the user interacted.

On Step 230, the personalized carousel may be generated, e.g., as an overlay over the display of the user. In some exemplary embodiments, the personalized carousel may replace a visible portion of the feed in the display, may replace the feed carousel, or the like. In some exemplary embodiments, the personalized carousel may be presented in case the user has scrolled back up to the article, in case the user consumed a target content of a card and has returned to the original article, or in any other case. In some exemplary embodiments, the content items may comprise one or more content cards of the feed, one or more content items from a repository that share attributes with content cards of the feed, or the like. In some exemplary embodiments, the content items may comprise one or more content items that share one or more attributes with the one or more content cards, such as sharing a topic, a publisher, a visual appearance, or the like.

In some exemplary embodiments, the content items to be displayed in the personalized carousel widget may be determined or selected based on an interaction of the user with the GUI while the user was exposed to the feed, such as based on interactions that indicate that the user is interested in a content item. In some exemplary embodiments, the content cards for the personalized carousel may be identified and/or selected based on direct or indirect user interactions with the one or more content cards in the feed. For example, in case a user has lingered above a content card associated with a target content page, the content card may be added to the personalized carousel, a content card associated with the same target page may be added to the personalized carousel, a content card associated with a different target page with similar content or topic may be added to the personalized carousel, or the like. As another example, in case the user has consumed a content card linked to target content and then returned to the page, the personalized carousel may be generated to not include the exact same content card, as it has already been consumed. Instead, the personalized carousel may be generated to include a different content card with similar attributes, e.g., similar content, a same publisher, or the like.

Referring now to FIGS. 3A-3F illustrating embodiments of an exemplary GUI, in accordance with some exemplary embodiments of the disclosed subject matter.

Figure 3A:
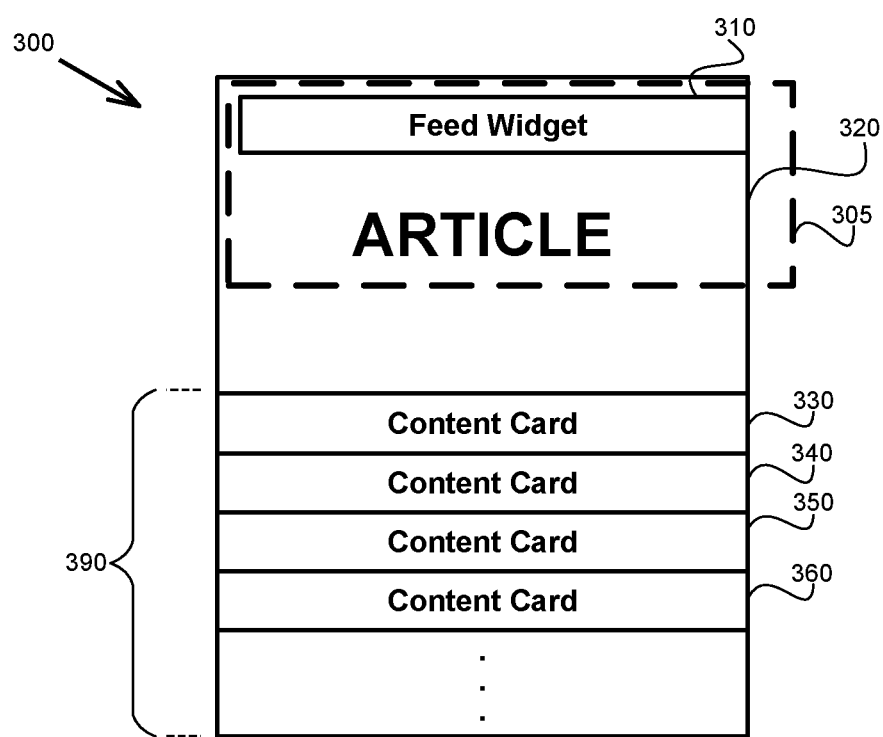
FIGS. 3A-3F illustrate embodiments of an exemplary GUI, in accordance with some exemplary embodiments of the disclosed subject matter.

FIG. 3A illustrates an exemplary GUI 300 of a page, in accordance with some exemplary embodiments of the disclosed subject matter. In some exemplary embodiments, a Display 305 of GUI 300 may include a portion of the page that is visible on a screen of a user device. In some exemplary embodiments, portions of GUI 300 that are not included in Display 305 may not be currently visible to the user.

In some exemplary embodiments, GUI 300 may comprise an Article 320 that may be partially visible in Display 305, and a Feed 390 that is currently not visible in Display 305. In some exemplary embodiments, FIG. 3A illustrates an initial state of the GUI 300 when a user starts to consume Article 320. In some exemplary embodiments, Article 320 may comprise a news article, an image, a story, or the like. For example, Feed 390 may comprise recommendations similar to Article 320, advertisements relating to Article 320, or the like.

In some exemplary embodiments, Feed 390 may comprise one or more Content Cards 330, 340, 350, and 360 that may be linked to target content pages, may comprise media, recommendations, comment elements, or the like. Any other number or type of content cards or content items may be included in Feed 390. For example, Feed 390 may comprise 100 items, 1000 items, or the like. Additionally or alternatively, as the user scrolls down, additional items may be loaded. Feed 390 may implement an infinite scrolling design pattern, where content cards are continually loaded into the interface as the user scrolls downwards. The user may never, or infrequently, reach the end of the page, instead, each time the user scrolls down and reaches a current end of page, the user may be presented with additional content, providing the impression of a perpetual content stream. In some exemplary embodiments, Feed 390 may provide to the user a UX in which the user may endlessly (or, at least, until no additional content is available to be loaded) scroll down and more items may be displayed on the fly. In some exemplary embodiments, the items displayed in Feed 390 may be selected by an item selector, such as a content recommendation engine, an ad server, or the like, which may match items to the user viewing and Article 320 in view of user information, context, behavior information, historical tracking information and engagement data relating to the user or similar users, historical tracking information and engagement data relating to the Article 320 or similar articles, combination thereof, or the like.

In some exemplary embodiments, a classification of the user as a partial or full consumer may be dynamically adjusted, e.g., every one or more user interactions, every one or more identified events of a defined type, periodically, or the like. In some exemplary embodiments, in some cases, the user may be classified as a partial consumer, e.g., based on the location of Display 305 with respect to Article 320, based on a user profile, based on interaction patterns of the user, or the like. In such cases, a carousel GUI element such as Feed Widget 310 may be generated and placed over Display 305, within Display 305, or the like.

In some exemplary embodiments, Feed Widget 310 may comprise a carousel which may be utilized to display alternating items, such as a sequence of one or more altering reading recommendations. In some exemplary embodiments, Feed Widget 310 may be configured to present feed items that are estimated to be of interest to the user, e.g., based on a user profile, based on previous user transactions, previous impressions, previous conversions, previous engagements, an order of the feed items, or the like. In some exemplary embodiments, Feed Widget 310 may be configured to present one or more items of appearing in Feed 390, e.g., Content Cards 330, 340, 350, and 360, one or more content recommendations based on the recommendations that appear in Feed 390, or the like. In some exemplary embodiments, Feed Widget 310 may display recommendations regarding the same content as in Feed 390 in a same or different presentation manner. As an example, Content Card 330 may comprise a reading recommendation linked to a blog, the reading recommendation comprising text from the blog and a landscape image. According to this example, Feed Widget 310 may comprise different text from the same blog, a different image from the same blog, or the like.

In some exemplary embodiments, Feed Widget 310 may be displayed in a predetermined location of Display 305, in a dynamically determined location of Display 305, or the like. As exemplified in FIGS. 3A-3B, Feed Widget 310 may be located at the top area of Display 305. In other cases, Feed Widget 310 may be located in any other location of Display 305. In some exemplary embodiments, Feed Widget 310 may present a content card from Feed 390, e.g., Content Card 330. In some exemplary embodiments, Feed Widget 310 may be positioned in a static relative location with respect to Display 305, e.g., always retaining the carousel element at the bottom of Display 305, or in any other position, regardless of changes of Display 305 occurring due to user scrolls.

Figure 3B:
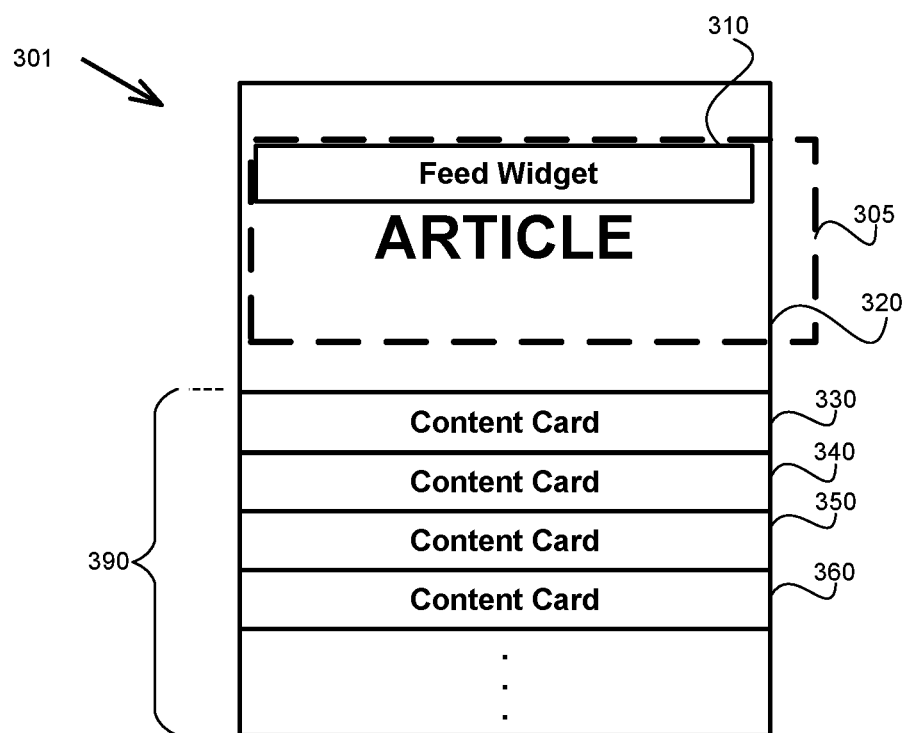

FIG. 3B illustrates an exemplary GUI 301, in accordance with some exemplary embodiments of the disclosed subject matter. In some exemplary embodiments, GUI 301 may comprise or correspond to GUI 300 (FIG. 3A) with an updated Display 305. In some exemplary embodiments, GUI 301 may illustrate GUI 300 after the user has scrolled further down the page, thereby modifying the visible Display 305. As can be appreciated from FIG. 3B, Display 305 is now lower in the page compared to Display 305 of GUI 300 (FIG. 3A). In some exemplary embodiments, Feed 390 may not be visible in Display 305 of GUI 301. In some cases, a user may scroll down to consume more of Article 320, in order to read comments (not shown) about Article 320 prior to reading Article 320, in order to consume Feed 390 prior to reading Article 320, or the like.

In some exemplary embodiments, the classification of the user may be recalculated based on the user interaction with GUI 301, e.g., scrolling down GUI 301. In some exemplary embodiments, the re-calculation may take into consideration attributes of GUI 301 such as a modified distance between Display 305 and Feed 390, a time between moving from GUI 300 to GUI 301, cursor movements of the user, a user profile, previous down scrolls of the user in articles and their rates of reaching their feeds, or the like. In some exemplary embodiments, based on the classification, Feed Widget 310 may be removed, modified, retained, or the like. As illustrated in FIG. 3B, in the current case Feed Widget 310 was determined to be retained in Display 305.

Figure 3C:
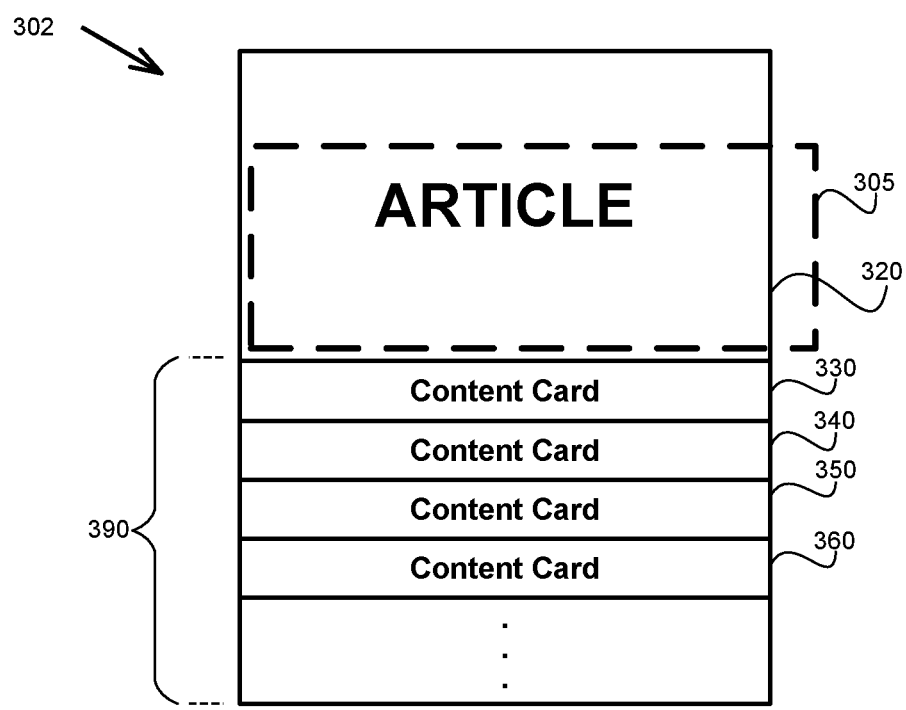

FIG. 3C illustrates an exemplary GUI 302, in accordance with some exemplary embodiments of the disclosed subject matter. In some exemplary embodiments, GUI 302 may comprise or correspond to GUI 301 (FIG. 3B) with an updated Display 305. In some exemplary embodiments, GUI 302 may illustrate GUI 301 after the user has scrolled further down the page, thereby modifying the visible Display 305. As can be appreciated from FIG. 3C, Display 305 is now lower in the page compared to Display 305 of GUI 301 (FIG. 3B). In some exemplary embodiments, Feed 390 may be nearly reached by Display 305 of GUI 302, e.g., as the distance between Feed 390 and Display 305 may be below a distance threshold.

In some exemplary embodiments, the classification of the user may be recalculated based on the user interaction with GUI 302, e.g., scrolling down GUI 302. In some exemplary embodiments, the re-calculation may determine that the probability that the user will reach Feed 390 has increased, e.g., since the user has nearly reached Feed 390, since the user is consistently scrolling down, since similar interactions of the user have previously resulted with reaching Feed 390, based on cursor movement patterns of the user, based on attributes of Article 320 with respect to the user profile, or the like. In some exemplary embodiments, in case the probability that the user will reach Feed 390 is determined to comply with a threshold, the user may be classified as a full consumer, and Feed Widget 310 (FIG. 3B) may be removed from Display 305, e.g., as illustrated in FIG. 3C.

Alternatively, based on the classification, Feed Widget 310 may be modified, retained, or the like. For example, Feed Widget 310 may be removed only when the Display 305 includes Feed 390, such as exemplified by FIG. 3D.

Figure 3D:
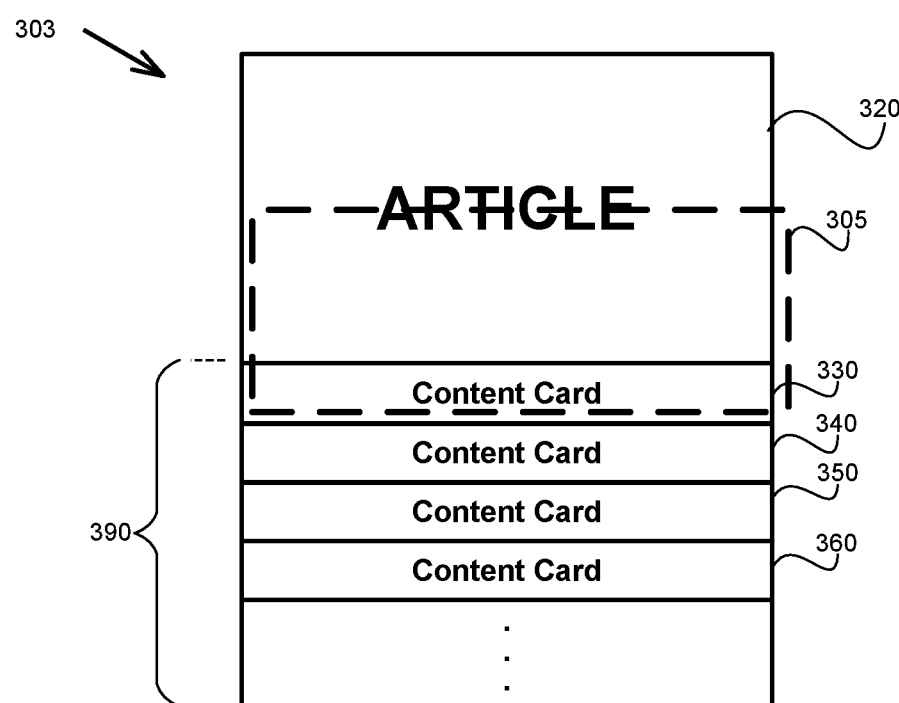

FIG. 3D illustrates an exemplary GUI 303, in accordance with some exemplary embodiments of the disclosed subject matter. In some exemplary embodiments, GUI 303 may comprise or correspond to GUI 302 (FIG. 3C) with an updated Display 305. In some exemplary embodiments, GUI 303 may illustrate GUI 302 after the user has scrolled further down the page, thereby modifying the visible Display 305. As can be appreciated from FIG. 3D, Display 305 is now lower in the page compared to Display 305 of GUI 302 (FIG. 3C), and has reached one or more first content cards of Feed 390, e.g., Content Card 330.

In some exemplary embodiments, since a portion of Feed 390 is visible in GUI 303, the classification of the user may be adjusted to classify the user as a full consumer with a confidence score of 100%. In some exemplary embodiments, based on the classification of the user as a full consumer, Feed Widget 310 may be determined to be redundant, and Feed Widget 310 may continue to be hidden from Display 305, removed from GUI 303, may be determined not to be displayed, or the like.

Figure 3E:
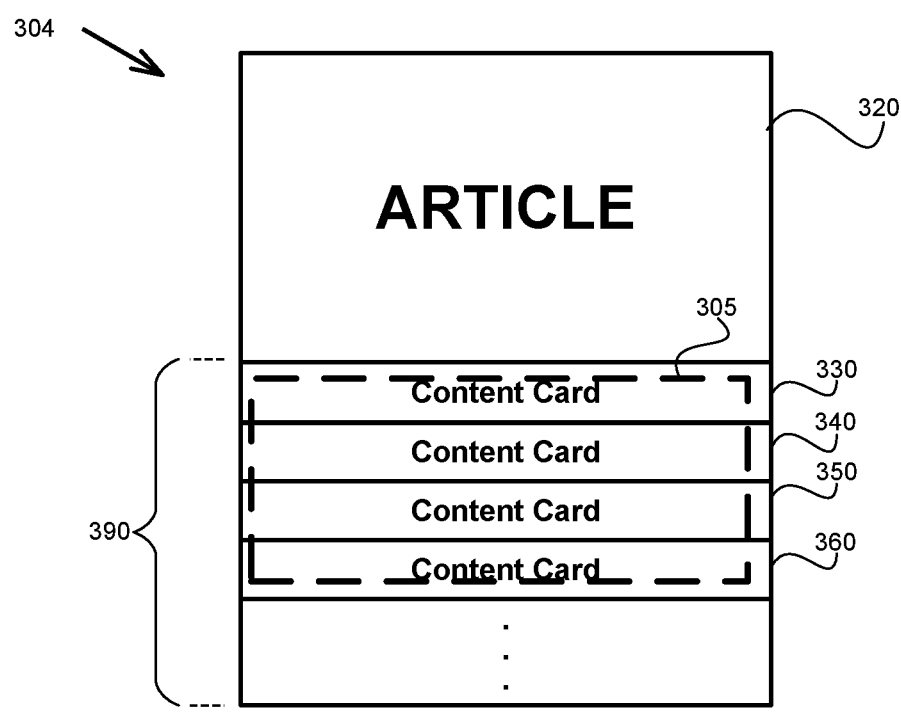

FIG. 3E illustrates an exemplary GUI 304, in accordance with some exemplary embodiments of the disclosed subject matter. In some exemplary embodiments, GUI 304 may comprise or correspond to GUI 303 (FIG. 3D) with an updated Display 305. As can be appreciated from FIG. 3E, Display 305 is now lower in the page compared to Display 305 of GUI 303 (FIG. 3D), and has reached additional content cards of Feed 390, e.g., Content Card 340, 350, and 360. In some exemplary embodiments, Display 305 of GUI 304 may exclude any portions of Article 320.

In some exemplary embodiments, since Feed 390 is visible in GUI 304, the classification of the user as a full consumer may be retained with a confidence score of 100%, and Feed Widget 310 may not be added or presented in Display 305.

Figure 3F:
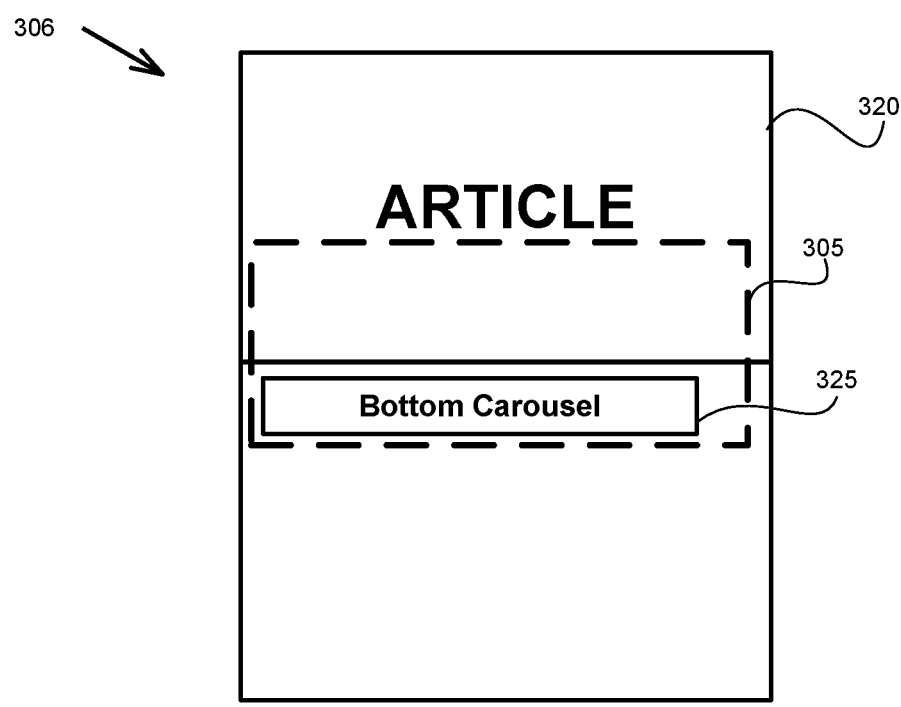

FIG. 3F illustrates an exemplary GUI 306, in accordance with some exemplary embodiments of the disclosed subject matter. In some exemplary embodiments, GUI 306 may comprise or correspond to GUI 304 (FIG. 3E) with an updated Display 305. In some exemplary embodiments, GUI 306 may illustrate GUI 304 after the user has scrolled up the page, thereby modifying the visible Display 305. As can be appreciated from FIG. 3F, the user has returned up to view an area of Article 320, which is now depicted in Display 305.

In some exemplary embodiments, as the user scrolls up from Feed 390, Feed 390 may be removed from GUI 306, hidden from it, or the like. In some exemplary embodiments, Bottom Carousel Widget 325 may be displayed, e.g., replacing Feed 390 (FIG. 3E) in Display 305, in addition to Feed 390, on top of Feed 390, or the like. In some exemplary embodiments, Bottom Carousel 325 may comprise a carousel widget, e.g., a BottomReminder widget, that may be similar to Feed Widget 310 (FIG. 3B).

In some exemplary embodiments, Bottom Carousel 325 may be displayed on top of Article 320, e.g., in an overlay covering a portion of Article 320, in a portion of Display 305 that is not reserved for Article 320, or the like. In some cases, the layout of Article 320 may be modified to allocate space for Bottom Carousel 325. In some exemplary embodiments, Bottom Carousel 325 may be positioned in any other area of Display 305.

In some exemplary embodiments, Bottom Carousel 325 may be positioned in a static relative location with respect to Display 305, e.g., always retaining the carousel element at the bottom of Display 305, or in any other position, regardless of changes of Display 305 occurring due to user scrolls. In some exemplary embodiments, positioning Bottom Carousel 325 at a bottom of Display 305 or portion thereof may resemble Feed 390, thereby remaining the user of content items perceived at Feed 390.

In some exemplary embodiments, Bottom Carousel 325 may comprise a carousel displaying a plurality of items. The displayed items may be items that were previously displayed in Feed 390. In some exemplary embodiments, in view of user interactions with Feed 390, such as mouse hover actions, a scrolling speed of the user, an acceleration thereof, eye tracking, device orientation over time, or the like, one or more content cards in Feed 390 that are potentially of interest to the user may be determined, identified, or the like. Such items may be selected to be displayed in Bottom Carousel 325. In some exemplary embodiments, items that are similar to the content cards that had drawn the user's attention may be selected to be displayed in Bottom Carousel 325. In some exemplary embodiments, any other items may be displayed in Bottom Carousel 325. In some cases, providing various types of content items that may or may not be associated to perceived content items may expose the user to a more diverse set of content items.

In some exemplary embodiments, content items that are selected to be displayed in Bottom Carousel 325 may be ordered according to a ranking. The ranking may be based on a probability that the user will be interested in the item, such as in view of user information, static information regarding the user, dynamic information regarding the user, a session context, user activity and engagement, or the like. In some exemplary embodiments, content items selected to be displayed in Bottom Carousel 325 may be displayed in a similar or different manner from Feed 390. For example, a selected card may be displayed in a modified manner in view of a different aspect ratio of the available placeholder in Bottom Carousel 325 compared to a card element within Feed 390, or the like.

Referring now to FIG. 4 illustrating an exemplary embodiment of a display, in accordance with some exemplary embodiments of the disclosed subject matter. In some exemplary embodiments, Display 400 may comprise an Article 420 that may correspond to Article 320 (FIGS. 3A-3F). In some exemplary embodiments, Display 400 may comprise a Feed Widget 410 that may correspond to Feed Widget 310 (FIGS. 3A-3B).

In some exemplary embodiments, Display 400 may be browsed at a user device such as a laptop, a personal computer, or the like, e.g., which may have a relatively large screen. In some exemplary embodiments, Feed Widget 410 and/or any other carousel element may be added to Display 400 in a manner that matches the screen size. In some exemplary embodiments, Feed Widget 410 may be added to Display 400, e.g., in a right bottom side of Display 400, e.g., matching a rather large screen size. In some cases, Feed Widget 410 may be added to the left bottom side of Display 400. In some exemplary embodiments, Feed Widget 410 may be linked to a target content page, and may comprise an Image 410a associated with the target page, a Summary 410b of the content of the target page, or the like.

In some exemplary embodiments, Feed Widget 410 may implement a carousel GUI element that rotates between different card items or content cards. The rotation may be performed periodically. Additionally or alternatively, a user may invoke a rotation by selecting or pressing on Link 410c, in order to view the next recommendation card of the carousel.

Figure 5:
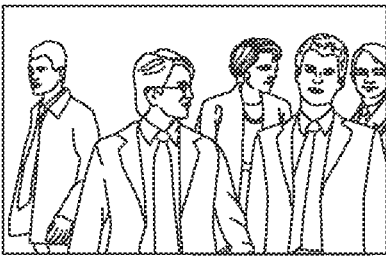
FIG. 5 illustrates an exemplary embodiment of a display, in accordance with some exemplary embodiments of the disclosed subject matter.

Referring now to FIG. 5 illustrating an exemplary embodiment of a display, in accordance with some exemplary embodiments of the disclosed subject matter. In some exemplary embodiments, Display 500 may comprise an Article 520 that may correspond to Article 420 (FIG. 4). In some exemplary embodiments, Display 500 may comprise a Feed Widget 510 that may correspond to Feed Widget 410 (FIG. 4).

In some exemplary embodiments, Display 500 may be browsed at a user device such as a smartphone, a Personal Digital Assistance (PDA), or the like, e.g., which may have a relatively small screen, which may have an aspect ratio of 373×421 or any other ratio, or the like. In some exemplary embodiments, Feed Widget 510 and/or any other carousel element may be added to Display 500 in a manner that matches the screen size, a ratio of the screen, or the like. As illustrated in FIG. 5, Feed Widget 510 may be positioned at the bottom of Display 500 to the entire width of Display 500, e.g., thereby being suited for small sized screens, for certain ratios of a display, or the like, for which smaller content displays may be difficult to read.

Figure 6:
FIG. 6 illustrates an exemplary embodiment of a display, in accordance with some exemplary embodiments of the disclosed subject matter.

Referring now to FIG. 6 illustrating an exemplary embodiment of a display, in accordance with some exemplary embodiments of the disclosed subject matter. In some exemplary embodiments, Display 600 may comprise an Article 620 that may correspond to Article 520 (FIG. 5). In some exemplary embodiments, Display 600 may comprise a Feed Widget 610 that may correspond to Feed Widget 510 (FIG. 5).

In some exemplary embodiments, Display 600 may be browsed at a user device such as a smartphone, a PDA, or the like, e.g., which may have a relatively small screen, an aspect ratio of 400×497 or any other ratio, or the like. In some exemplary embodiments, Feed Widget 610 and/or any other carousel element may be added to Display 600 in a manner that matches the screen size of the rendering device, a ratio of the screen, or the like. As illustrated in FIG. 6, Feed Widget 610 may be positioned at the top of Display 600 to the entire width of Display 600, e.g., thereby being suited for small sized screens, for certain ratios of a display, or the like.

In some exemplary embodiments, Display 600 may be responsive, and may dynamically shift between manners of displaying Feed Widget 610 such as based on different aspect ratios. For example, in case a ratio of a screen changes, Feed Widget 610 may be displayed in a different area of Display 600, in an area of Display 600 with a different diameter, may occupy a different portion of Display 600, or the like.

Figure 7:
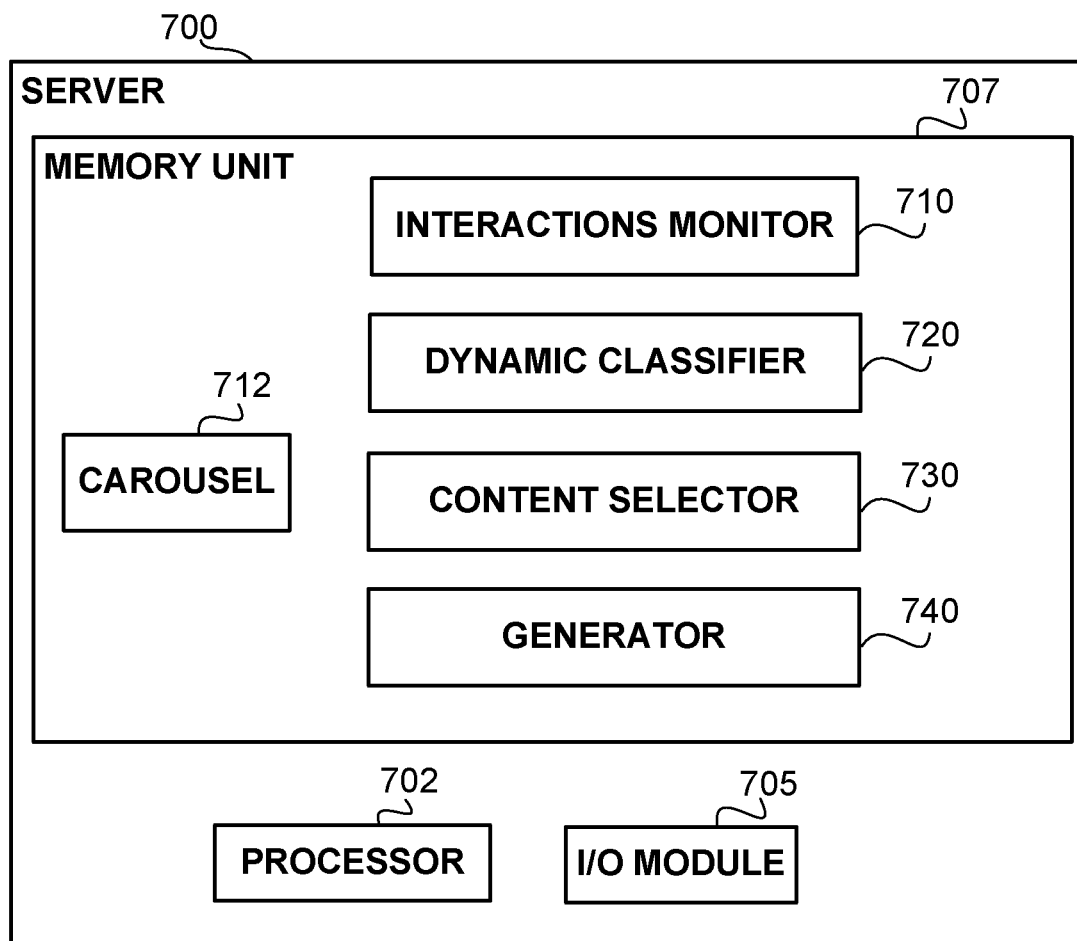
FIG. 7 shows a block diagram of an apparatus, in accordance with some exemplary embodiments of the disclosed subject matter.

Referring now to FIG. 7 showing a block diagram of an apparatus, in accordance with some exemplary embodiments of the disclosed subject matter.

In some exemplary embodiments, Apparatus 700 may comprise a Processor 702. Processor 702 may be a Central Processing Unit (CPU), a microprocessor, an electronic circuit, an Integrated Circuit (IC) or the like. Processor 702 may be utilized to perform computations required by Apparatus 700 or any of its subcomponents. Processor 702 may be configured to execute computer-programs useful in performing the methods of FIGS. 1-2, or the like.

In some exemplary embodiments of the disclosed subject matter, an Input/Output (I/O) Module 705 may be utilized to provide an output to and receive input from a user such as via user interactions. I/O Module 705 may be used to transmit and receive information to and from the user or any other apparatus, e.g., one or more servers, which may be in communication therewith.

In some exemplary embodiments, Apparatus 700 may comprise a Memory Unit 707. Memory Unit 707 may be a short-term storage device or long-term storage device. Memory Unit 707 may be a persistent storage or volatile storage. Memory Unit 707 may be a disk drive, a Flash disk, a Random Access Memory (RAM), a memory chip, or the like. In some exemplary embodiments, Memory Unit 707 may retain program code operative to cause Processor 702 to perform acts associated with any of the subcomponents of Apparatus 700. In some exemplary embodiments, Memory Unit 707 may retain program code operative to cause Processor 702 to perform acts associated with any of the steps in FIGS. 1-2, or the like.

The components detailed below may be implemented as one or more sets of interrelated computer instructions, executed for example by Processor 702 or by another processor. The components may be arranged as one or more executable files, dynamic libraries, static libraries, methods, functions, services, or the like, programmed in any programming language and under any computing environment.

In some exemplary embodiments, Interactions Monitor 710 may be configured to monitor user interactions with a display of a browsed page such as cursor movements, scrolling down and up, a speed of scrolling, a vision focus, or the like. In some exemplary embodiments, the interactions may be monitored via I/O Module 705 or any other component of Apparatus 700, of a device housing Apparatus 700, or the like.

In some exemplary embodiments, Dynamic Classifier 720 may be configured to dynamically determined or adjust a classification of a user, e.g., based on the user interactions monitored by Interactions Monitor 710. In some exemplary embodiments, Dynamic Classifier 720 may classify the user as a full consumer of the page or a partial consumer of the page, e.g., taking into account additional information of the user such as behavior patterns that are typical to the user, behavior patterns that are typical to a group of users that may correspond to the user, or the like. In some exemplary embodiments, full consumers may be expected to reach a feed of the page, while partial consumers may not be expected to reach the feed of the page.

In some exemplary embodiments, Dynamic Classifier 720 may adjust the classification periodically, upon Interactions Monitor 710 identifying a new user interaction with the GUI, upon identifying an event, in case a predetermined timeframe has passed from a previous classification, or the like. As an example, each time that the user is interacting with the GUI of the display, Dynamic Classifier 720 may recalculate or adjust the probability that the user may or may not read the article until the end.

In some exemplary embodiments, Content Selector 730 may be configured to select content for a Carousel Element 712, e.g., in case the user is classified as a partial consumer. In some exemplary embodiments, content cards may be selected for the Carousel Element 712 from the feed, from a repository of content elements, or the like.

In some exemplary embodiments, Content Selector 730 may be configured to select content only in case Carousel Element 712 is determined to be presented in the display. In some exemplary embodiments, determining whether or not to display Carousel Element 712 to a user may be based on a probability or likelihood that the user will reach the feed, as determined by Dynamic Classifier 720. In some exemplary embodiments, based on the classification determined by Dynamic Classifier 720, a GUI element such as a feed carousel widget, a personalized carousel widget, or the like, e.g., Carousel Element 712, may be determined to be displayed to the user, removed from the display, modified in any other way, or the like. In some exemplary embodiments, the calculated probability of Dynamic Classifier 720 may be utilized to determine display and presentation properties of Carousel Element 712.

In some exemplary embodiments, in case the probability that the user will reach the feed overpasses a threshold, the user may be classified by Dynamic Classifier 720 as a full consumer and Carousel Element 712 may be determined not to be displayed, to be displayed in a different area, to be displayed with a different saliency level, or the like.

In some exemplary embodiments, Generator 740 may be configured to generate Carousel Element 712, e.g., in case the probability that the user will reach the feed is below a threshold. In some exemplary embodiments, Carousel Element 712 may be generated as a carousel element including content items that are selected by Content Selector 730, and may be placed in a determined location of the user's display. In some exemplary embodiments, Generator 740 may generate Carousel Element 712 with display properties that were defined by Content Selector 730.

It is noted that while the disclosed subject matter is exemplified using carousel and feed elements, the disclosed subject matter is not limited to such embodiments. Any GUI widgets can be utilized such as, for example, a single item container widget, a recommendation widget, a rotatable container widget, a multi-element container widget, or non-endless feed widget, or the like.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   identifying an ordered sequence of user interactions of a user occurring within a browsing session, the browsing session is a session in which the user is utilizing a browser to interact with a single web page, the single web page comprising an article and a feed located below the article, the feed comprising a plurality of content items, the ordered sequence comprising a first interaction, a second interaction, a third interaction, and a fourth interaction, wherein the first interaction occurs in the ordered sequence before the second interaction, wherein the second interaction occurs in the ordered sequence before the third interaction, wherein the third interaction occurs in the ordered sequence before the fourth interaction;
   wherein the first interaction comprising the user viewing the article on the single web page, wherein a portion of the single web page that is being displayed during the first interaction includes the article or portion thereof and excludes any portion of the feed, whereby the feed is not viewable by said user during the first interaction due to the feed being located below the article;
   wherein the second interaction comprising the user scrolling down the single web page at least until the feed becomes viewable by the user;
   wherein the third interaction comprising the user interacting with the feed, the interaction comprising an action selected from a group of actions consisting of:
   a mouse hover,
   a scrolling speed,
   an acceleration of a scrolling speed,
   an eye movement,
   an orientation of a device rendering the page,
   a cursor movement,
   a selection of an item,
   a scrolling pattern,
   a mobile device angle, and
   an eye tracking information;
   wherein the fourth interaction comprising scrolling up the web page at least until the feed is no longer viewable and the article is viewable; and
   in response to said identifying, displaying a bottom carousel widget, said bottom carousel widget is configured to display one or more content items in response to the fourth interaction.

2. The method of claim 1, wherein the bottom carousel widget is displayed as an overlay over the article, whereby covering a portion of the article.

3. The method of claim 1, wherein the bottom carousel widget is positioned in a static location that is maintained irrespective of subsequent scrolling events.

4. The method of claim 1, wherein the bottom carousel widget replaces the feed by displaying the one or more content items instead of the feed displaying the content items.

5. The method of claim 1, wherein the bottom carousel widget is configured to display content item cards that are selected based on user interactions of the user with the feed.

6. The method of claim 1, wherein the feed initially displays a content item, wherein the one or more content items displayed by the bottom carousel widget include the content item, wherein an implied user interest in the content item is determined based on a user interaction of the user with the feed, whereby the bottom carousel widget serves as a reminder of the content item that was estimated to draw the user's attention when displayed in the feed.

7. The method of claim 1, wherein the feed is implementing an infinite scrolling design pattern.

8. The method of claim 1, wherein the bottom carousel widget is configured to periodically replace a displayed content item, the replaced displayed content item is selected from a content item repository.

9. The method of claim 1, wherein the bottom carousel widget is not visible in the portion of the single web page that is being displayed during the first interaction.

10. The method of claim 1, wherein the bottom carousel widget replaces the feed by displaying the at least one content item instead of the feed displaying the one or more content items.

11. The method of claim 1, wherein the at least one content item is retrieved from a content item repository and displayed by the bottom carousel widget and is selected based on user interactions of the user with the feed.

12. The method of claim 1, wherein the bottom carousel widget is configured to display a content item that was displayed in the feed and that the user had interacted with when the content item was displayed in the feed.

13. The method of claim 1, wherein the at least one content item displayed by the bottom carousel widget is selected based on identified interest of the user in content that was displayed in the feed.

14. The method of claim 1, wherein the at least one content item displayed is selected based on an estimation that the at least one content item is of interest to the user, the estimation is based on direct or indirect user interactions with the one or more content items while the one or more content items are displayed in the feed.

15. A system comprising:
   a content item repository connected to a computerized network; and
   a processor connected to the computerized network;
   wherein the processor is configured to execute a browser; and
   wherein the processor is configured to perform:
      identifying an ordered sequence of user interactions of a user occurring within a browsing session, the browsing session is a session in which the user is utilizing the browser to interact with a single web page, the single web page comprising an article and a feed located below the article, the feed comprising a plurality of content items that are retrieved from said content item repository, the ordered sequence comprising a first interaction, a second interaction, a third interaction, and a fourth interaction, wherein the first interaction occurs in the ordered sequence before the second interaction, wherein the second interaction occurs in the ordered sequence before the third interaction, wherein the third interaction occurs in the ordered sequence before the fourth interaction;

wherein the first interaction comprising the user viewing the article on the single web page, wherein a portion of the single web page that is being displayed during the first interaction includes the article or portion thereof and excludes any portion of the feed, whereby the feed is not viewable by said user during the first interaction due to the feed being located below the article;

wherein the second interaction comprising the user scrolling down the single web page at least until the feed becomes viewable by the user;

wherein the third interaction comprising the user interacting with the feed, the interaction comprising an action selected from a group of actions consisting of:
a mouse hover,
a scrolling speed,
an acceleration of a scrolling speed,
an eye movement,
an orientation of a device rendering the page,
a cursor movement,
a selection of an item,
a scrolling pattern,
a mobile device angle, and
an eye tracking information;

wherein the fourth interaction comprising scrolling up the web page at least until the feed is no longer viewable and the article is viewable; and in response to said identifying, displaying a bottom carousel widget, said bottom carousel widget is configured to display one or more content items in response to the fourth interaction.

16. The system of claim 15, wherein feed is implementing an infinite scrolling design pattern, the bottom carousel widget provides a periodically updated display of content items.

17. The system of claim 15, wherein the processor is configured to:
monitor user interactions with the feed;
analyze the user interactions to infer user attention to a content item displayed in the feed; and
select the least one content item to be displayed by the bottom carousel widget based on the inferred user attention to the content item.

18. The system of claim 15, wherein the bottom carousel widget is positioned in a static location that is maintained irrespective of subsequent scrolling events.

19. The system of claim 15, wherein the at least one content item is retrieved from the content item repository and displayed by the bottom carousel widget and is selected based on user interactions of the user with the feed.

20. A computer program product comprising a non-transitory computer readable medium retaining program instructions that when read by a processor, cause the processor to:
identify an ordered sequence of user interactions of a user occurring within a browsing session, the browsing session is a session in which the user is utilizing a browser to interact with a single web page, the single web page comprising an article and a feed located below the article, the feed comprising a plurality of content items, the ordered sequence comprising a first interaction, a second interaction, a third interaction, and a fourth interaction, wherein the first interaction occurs in the ordered sequence before the second interaction, wherein the second interaction occurs in the ordered sequence before the third interaction, wherein the third interaction occurs in the ordered sequence before the fourth interaction;

wherein the first interaction comprising the user viewing the article on the single web page, wherein a portion of the single web page that is being displayed during the first interaction includes the article or portion thereof and excludes any portion of the feed, whereby the feed is not viewable by said user during the first interaction due to the feed being located below the article;

wherein the second interaction comprising the user scrolling down the single web page at least until the feed becomes viewable by the user;

wherein the third interaction comprising the user interacting with the feed, the interaction comprising an action selected from a group of actions consisting of:
a mouse hover,
a scrolling speed,
an acceleration of a scrolling speed,
an eye movement,
an orientation of a device rendering the page,
a cursor movement,
a selection of an item,
a scrolling pattern,
a mobile device angle, and
an eye tracking information;

wherein the fourth interaction comprising scrolling up the web page at least until the feed is no longer viewable and the article is viewable; and in response to an identification of the ordered sequence of user interactions, display a bottom carousel widget, said bottom carousel widget is configured to display one or more content items in response to the fourth interaction.

21. The computer program product of claim 20, wherein the program instructions are retained as instructions to a web browser that are executed by the web browser when the web browser displays the page.

* * * * *